(12) United States Patent
Wanami

(10) Patent No.: US 7,401,532 B2
(45) Date of Patent: Jul. 22, 2008

(54) PASSENGER DETECTION SYSTEM

(75) Inventor: Shingo Wanami, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/390,664

(22) Filed: Mar. 28, 2006

(65) Prior Publication Data

US 2006/0219460 A1  Oct. 5, 2006

(30) Foreign Application Priority Data

Mar. 31, 2005  (JP) .............................. 2005-104943

(51) Int. Cl.
*G01L 1/00* (2006.01)
(52) U.S. Cl. ................................ 73/862.626
(58) Field of Classification Search ............. 73/862.626
See application file for complete search history.

(56) References Cited

U.S. PATENT DOCUMENTS

| | | | | | |
|---|---|---|---|---|---|
| 5,446,391 | A | * | 8/1995 | Aoki et al. ................... | 324/661 |
| 5,525,843 | A | * | 6/1996 | Howing ....................... | 307/9.1 |
| 5,770,997 | A | * | 6/1998 | Kleinberg et al. ............ | 340/438 |
| 6,158,768 | A | * | 12/2000 | Steffens et al. ............... | 280/735 |
| 6,218,632 | B1 | * | 4/2001 | McCarthy et al. ............ | 177/144 |
| 6,392,542 | B1 | * | 5/2002 | Stanley ....................... | 340/561 |
| 6,577,023 | B1 | * | 6/2003 | Stanley et al. ............... | 307/10.1 |
| 6,609,055 | B2 | * | 8/2003 | Stanley ......................... | 701/45 |
| 6,693,440 | B2 | * | 2/2004 | Basir et al. ................... | 324/662 |
| 6,816,077 | B1 | | 11/2004 | Shieh et al. | |
| 6,825,765 | B2 | * | 11/2004 | Stanley et al. ............... | 340/561 |
| 6,929,324 | B2 | * | 8/2005 | Enomoto et al. ......... | 297/217.3 |
| 6,968,263 | B1 | * | 11/2005 | Norton ......................... | 701/45 |
| 7,065,438 | B2 | * | 6/2006 | Thompson et al. ............ | 701/45 |
| 7,135,983 | B2 | * | 11/2006 | Filippov et al. ............. | 340/667 |
| 7,151,452 | B2 | * | 12/2006 | Shieh .......................... | 340/561 |
| 7,180,306 | B2 | * | 2/2007 | Stanley et al. ............... | 324/686 |
| 7,190,277 | B2 | * | 3/2007 | Fultz et al. .................. | 340/667 |
| 2004/0196150 | A1 | | 10/2004 | Shieh et al. | |
| 2004/0199318 | A1 | | 10/2004 | Shieh et al. | |

FOREIGN PATENT DOCUMENTS

JP  11-271463  10/1999

* cited by examiner

*Primary Examiner*—Edward Lefkowitz
*Assistant Examiner*—Octavia Davis
(74) *Attorney, Agent, or Firm*—Harness, Dickey & Pierce, PLC

(57) ABSTRACT

A passenger detection system for a person on a seat of a vehicle, includes a long range capacitance sensor for measuring a long range capacitance between a seating portion of the seat and a body of the vehicle and a short range capacitance sensor for measuring a short range capacitance in the seat, and a detection unit for detecting a passenger on the seat based on the measured long range capacitance and the measured short range capacitance. Therefore, the passenger detection system accurately detects a passenger on the seat of the vehicle while suppressing a detection error caused by an external effect.

21 Claims, 5 Drawing Sheets

PASSENGER DETECTION SYSTEM

CROSS REFERENCE TO RELATED APPLICATION

This application is based on and incorporates herein by reference Japanese patent application No. 2005-104943 filed on Mar. 31, 2005.

FIELD OF THE INVENTION

The present invention relates to a passenger detection system for detecting a passenger on a seat of a vehicle, and in particular, for determining whether the passenger on the seat is a grown person.

BACKGROUND OF THE INVENTION

An air bag system is installed in many vehicles. The air bag system is installed not only to the driver's seat but also to the passenger's seat, which is next to the driver's seat. The air bag system inflates an air bag when it detects a collision of a vehicle with an object by means of an acceleration sensor in the vehicle.

The air bag system is generally set to inflate the air bag on the side of the driver's seat when the vehicle collides with an object, irrespective of whether a passenger is on the passenger's seat. In recent years, however, it is desired that the air bag system controls the air bag based on a physical size of a person on the seat. In the case that a grown person is sifting on the seat, the air bag system can protect the person by inflating the air bag when the vehicle collides with the object. However, in the case that a child is seated in a child restraint system fixed to the seat in a backward-looking posture, the air bag cannot protect the child effectively.

To cope with the problem, a passenger detection system is provided for determining whether a person in the passenger's seat is a grown person or a child in a child restraint system by means of a sensor at the passenger's seat. In JP patent 3346464B, an example of the passenger detection system is disclosed which has multiple antenna electrodes installed to the seat and detects by using a pair of the electrodes a passenger on the seat.

However, the passenger detection system in the JP 3346464B cannot detect whether the passenger on the seat is a grown person or not with a sufficient accuracy when the seat gets wet. This is because a wet portion of the seat functions as an antenna electrode and an output power from the electrodes on the seat increases. The increase of the output power may cause the passenger detection system to wrongly recognize the child in the child restraint system as a grown person. In this case, the air bag tends to expand incorrectly.

Another passenger detection system is disclosed in U.S. Pat. No. 6,816,077, US 2004-0196150A1 and US 2004-0199318A1 (all of them correspond to JP 2002-347498A) which has a water sensor and/or a humidity sensor and detects with a high accuracy whether the passenger on the seat is a grown person even when the seat is get wet. However, the sensor dedicated for detecting water on the seat increases manufacturing cost of the passenger detection system.

SUMMARY OF THE INVENTION

It is therefore an object of the present invention to provide a passenger detection system for detecting a passenger on a seat of a vehicle while suppressing a detection error caused by an external effect.

A passenger detection system for a person on a seat of a vehicle, includes a first capacitance sensor for measuring a first capacitance between a seating portion of the seat and a body of the vehicle, a second capacitance sensor for measuring a second capacitance within the seat, and a detection unit which detects a passenger on the seat based on the measured first and second capacitances.

The passenger detection system can detect a state (e.g., a degree indicating how far the seat gets wet, humidity) of the seat by means of the second capacitance sensor. The passenger detection system can thereby detect presence/absence of a passenger on the seat or a physical size of the passenger. Thus, the passenger detection system can detect with a high accuracy the passenger on the seat based on the first capacitance and the state of the seat, even if the state changes.

For example, the detection unit detects the passenger by determining based on the measured second capacitance a threshold value and by comparing the threshold value with the measured first capacitance.

The first and second capacitance sensors can be constructed with a plurality of electrodes located in the seat, the first capacitance sensor measures as the first capacitance a capacitance between the body and the electrodes, and the second capacitance sensor measures as the second capacitance a capacitance between the electrodes. In this case, the electrodes have the same electric potential and are electrically separated from the body.

Alternatively, the first and second capacitance sensors are constructed with a first electrode and a second electrode having different surface areas. In this case, the second capacitance sensor measures as the second capacitance a capacitance between the first and second electrodes, and the first electrode has a surface area larger than the second electrode. For example, one of the first and second electrodes has the same electric potential with the body.

When the first capacitance is smaller than a first threshold value which is changed in accordance with the second capacitance, the detection unit detects that the passenger is a child or no passenger is on the seat. In contrast, when the first capacitance is larger than a second threshold value which is changed in accordance with the second capacitance and is larger than the first threshold, the detection unit detects that the passenger is a grown person. Furthermore, in a case where the first capacitance is between the first threshold value and the second threshold value, the detection unit detects that the passenger is a grown person when the second capacitance is smaller than a third threshold value.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
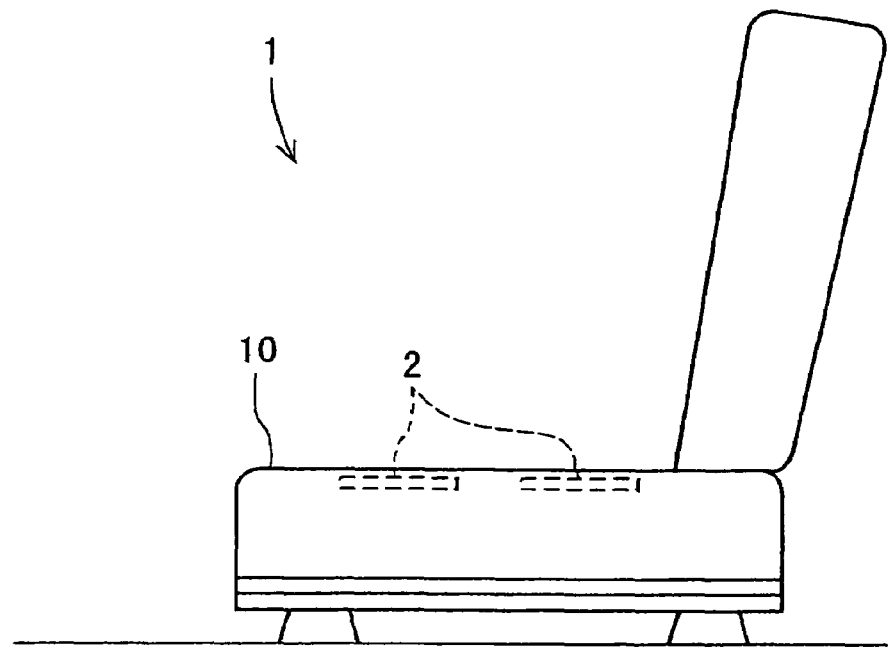
FIG. 1 is a side view showing a seat to which an electrode of a passenger detection system according to an embodiment is incorporated.
Figure 3:
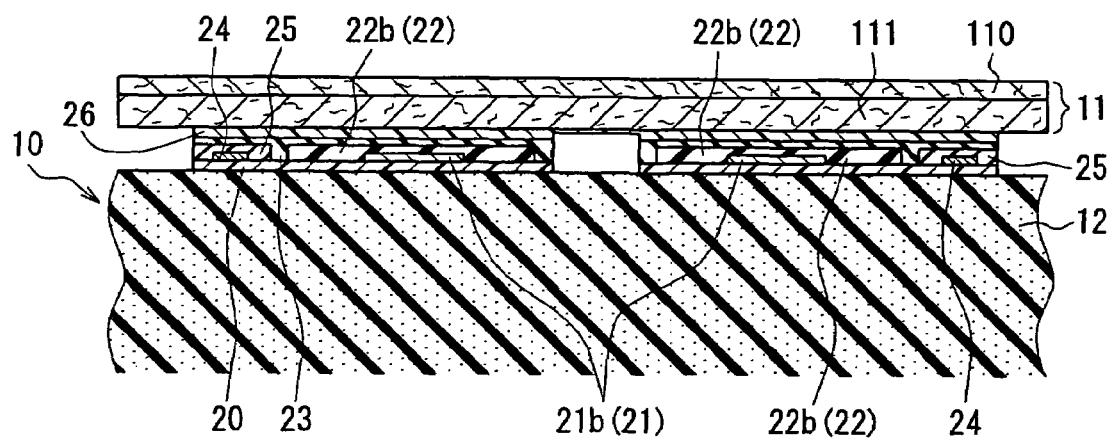
FIG. 3 is a cross sectional view of the seat taken along a line III-III in FIG. 2A.
Figure 2A:
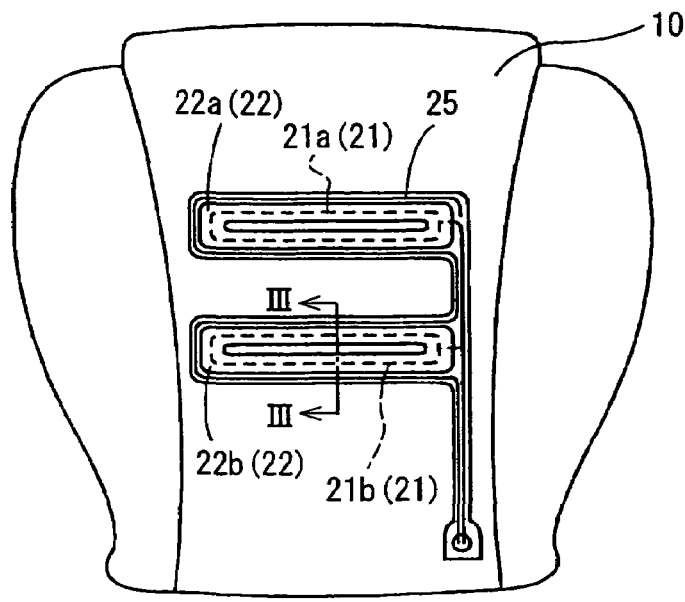
FIG. 2A is a top view showing a seating portion of the seat stripped of a soft cover.
Figure 2B:
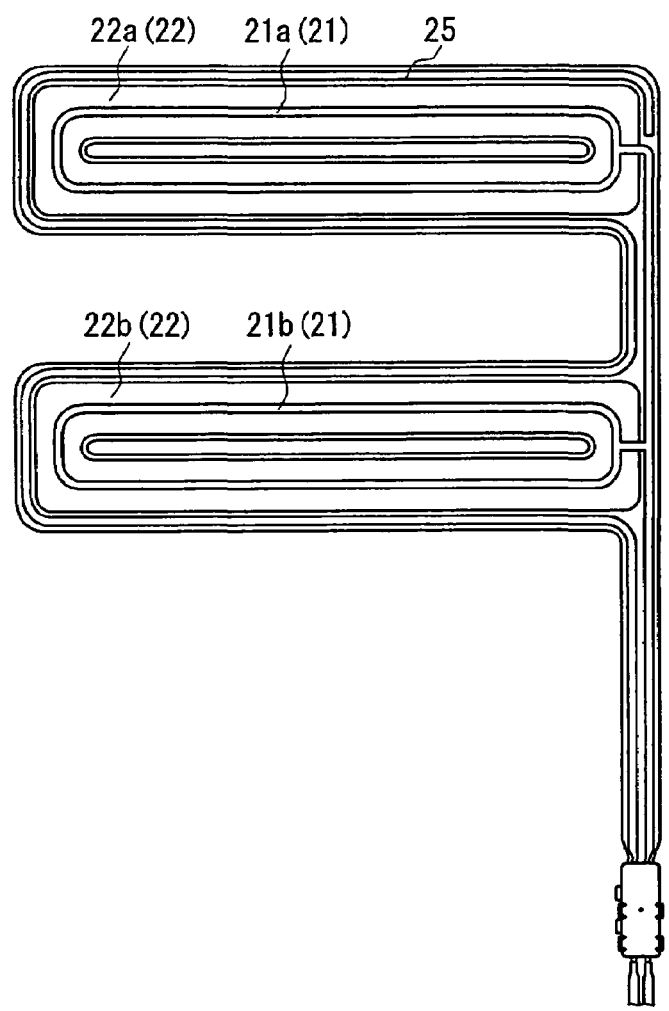
FIG. 2B is an enlarged view showing the electrode.

As shown in FIG. 1, a passenger detection system according to an embodiment of the present invention is installed to a passenger seat 1 of a vehicle.

The passenger detection system includes an electrode 2 which is incorporated to a seating portion 10 of the seat 1.

As shown in FIGS. 2A to 4, the electrode 2 includes a resin sheet 20 and first conductive portions 21a (21) and 21b (21) and a second conductive portion 24. The first conductive portions 21a and 21b are made of ink containing silver. The ink containing silver is applied to the resin sheet 20 to be dried on the resin sheet 20 so as to form the first conductive portions 21a and 21b. The resin sheet 20 is an example of an insulating film. Each of the first conductive portions 21a and 21b has a shape of a generally rectangular loop. The first conductive portions 21a and 21b are arranged with an interval between them and then are connected with each other through ink containing silver. Then, ink containing carbon is applied to the first conductive portions 21a and 21b and dried on them, to form first electrode portions 22a (22) and 22b (22) coating respectively the first conductive portions 21a and 21b. The first electrode portions 22a and 22b have shapes similar to the first conductive portions 21a and 21b. More specifically, each of the first electrode portions 22a and 22b has a shape of a generally rectangular loop having a hollow at its core axis at which the first conductive portion 21a or 21b is located. The first electrode portions 22a and 22b are arranged in a minor direction of their rectangular loops with an interval between them.

The second conductive portion 24 is made of ink containing silver. The ink containing silver is formed by being applied to the resin sheet 20 along peripheries of the first conductive portions 21a and 21b and by being dried on the resin sheet 20 so as to form the second conductive portion 24. Ink containing carbon is then applied to the second conductive portion 24 and dried on them, to form a second electrode portion 25 coating the second conductive portion 24. The second electrode portion 25 is located so that it is separated from but close to the first electrode portions 22a and 22b. An insulating adhesive 23 is applied to the surfaces of the first electrode portions 22a, 22b and the second electrode portion 25, and then a resin sheet 26 is put on the insulating adhesive 23. The electrode 2 is thus formed, which includes the resin sheet 20, the first conductive portions 21a, 21b, the first electrode portions 22a, 22b, the insulating adhesive 23, the second conductive portion 24, the second electrode portion 25 and the resin sheet 26. Thus, the electrode portions 22a, 22b and 25 are formed on the insulating film so that the first electrode portions 22a and 22b are separated from the second electrode portion 25.

The electrode 2 is incorporated to the seating portion 10 so that the first electrode portions 22a and 22b are aligned in the front-rear direction of the vehicle. In the electrode 2, the first conductive portions 21a and 21b and the second conductive portion 24 are electrically connected to a control unit 50. More specifically, the electrode 2 is located between a cushion pad 12 and a skin member 11 in which an outer skin 110 and a laminated layer 111 are formed together as a single body. Hereafter, a group consisting of the first electrode portions 22a and 22b is referred to the first electrode portion 22.

The control unit 50 applies predetermined electric currents to the first electrode portion 22 and the second electrode portion 25 and measures an amount of a change of electric fields generated at several points in the electrode 2. In addition, the control unit 50 outputs a signal to a terminal of the electrode 2, receives a signal from a terminal of the electrode 2, and thereby calculates a capacitance in the electrode 2 (specifically, a capacitance between the first electrode portion 22 and the second electrode portion 25) to detect a passenger on the seat 1. The control unit 50 may be any calculation device which outputs a signal to the electrode 2, receives a signal from the electrode 2, and thereby detects a passenger on the seat 1. In this embodiment, an ECU for a vehicle serves as the control unit 50.

The passenger detection system measures a long range capacitance between the seating portion 10 and the body of the vehicle, and a short range capacitance between the first electrode portion 22 and the second electrode portion 25. The measurement of the long range capacitance is made by applying a voltage between the seating portion 10 and the body. The measurement of the short range capacitance is made by applying a voltage between the first electrode portion 22 and the second electrode portion 25.

Figure 4:
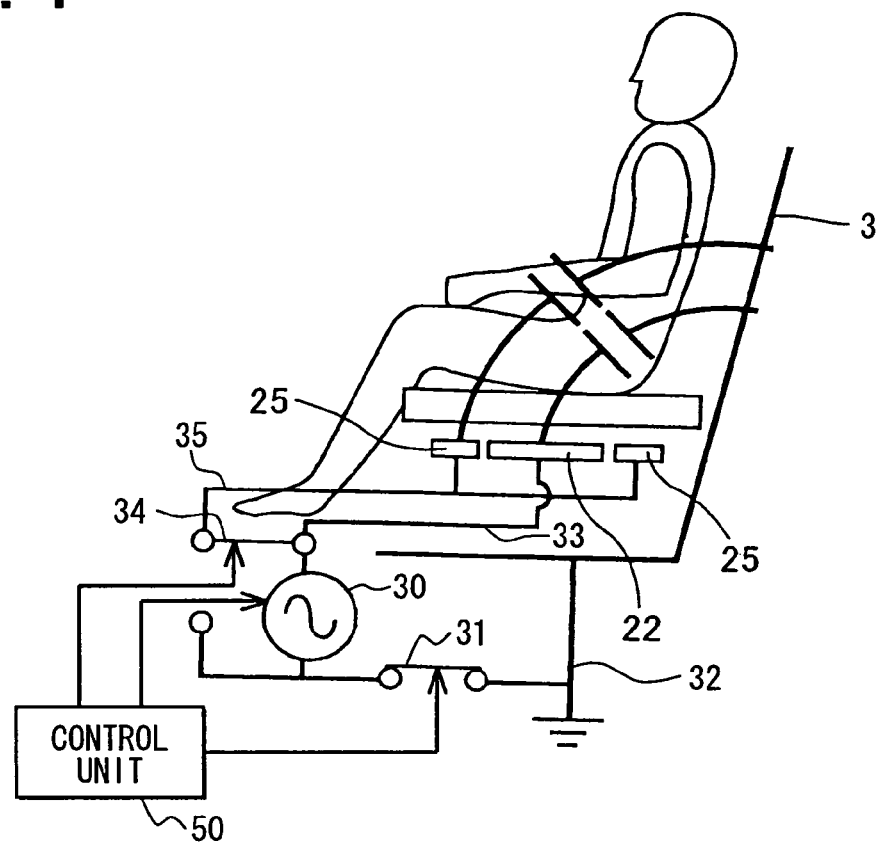
FIG. 4 is a schematic view showing a method in which the passenger detection system detects a long range capacitance.

The control unit 50 measures the long range capacitance by applying a signal with a predetermined high frequency and a predetermined low voltage to both the electrode 2 and the body and by measuring an amount of a change of an electric current provided from the control unit 50 to the electrode 2 or the body. Specifically, the control unit 50 makes, as shown in FIG. 4, a voltage source 30 apply the signal through a switch 31 and a line 32 to a grounded electrode 3 on the body. The control unit 50 also makes the voltage source 30 apply the signal through a line 33 to the first electrode portion 22. The control unit 50 also makes the voltage source 30 apply the signal through a switch 34 and a line 35 to the second electrode portion 25.

The voltage between the body and the electrode 2 generates an electric field. The electric field generates an electric current between the seating portion 10 and the body. In the case that the body of a passenger on the seat 1 is positioned in the electric field, the electric field is disturbed and the electric current changes accordingly. At the same time, an electric current (i.e. a loading current) supplied to the electrode 2 changes in response to the existence of the body between the electrodes 2 and 3. The body of the passenger on the seat 1 thus functions as a capacitor. The electric field shunts because of an impedance (including a resistance and capacitance) of the body. The electrodes 2 and 3 thus serve as a long range capacitance sensor. The electrode 2 and the electrode 3 at a backrest portion of the seat 1 are electrically separated. FIG. 4 does not show whether the body is electrically connected with the seating portion 10.

Figure 5:
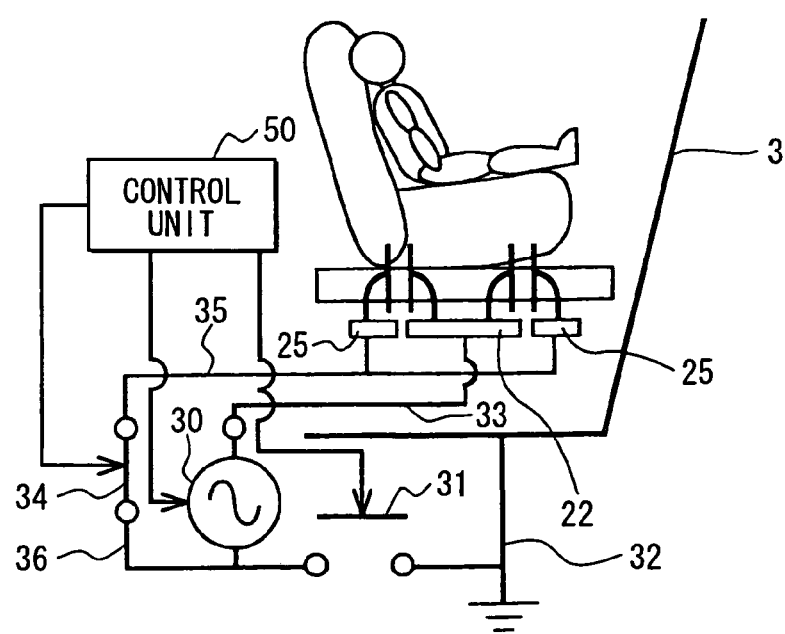
FIG. 5 is a schematic view showing a method in which the passenger detection system detects a short range capacitance.

The control unit 50 measures, as the short range capacitance, a capacitance between the first electrode portion 22 and the second electrode portion 25 by applying a signal with a predetermined high frequency and a predetermined low voltage to both the first electrode portion 22 and the second electrode portion 25 and by measuring an amount of a change of an electric current provided by the control unit 50 to the first electrode portion 22 or the second electrode portion 25. Specifically, the control unit 50 makes, as shown in FIG. 5, the voltage source 30 apply the signal through a line 33 to the first electrode portion 22. The control unit 50 also makes the voltage source 30 apply the signal through a line 36, the switch 34 and the line 35 to the second electrode portion 25. The control unit 50 also operates the switch 31 to disconnect the voltage source 30 from the line 32. More specifically, the control unit 50 sets the first electrode portion 22 at an electric potential which is lower than that at the second electrode portion 25, which has a surface area smaller than that of the first electrode portion 22. The first electrode portion 22 and the second electrode portion 25 thus serve as a short range capacitance sensor, which is a capacitance type sensor.

The short range capacitance depends on a disturbance at the seating portion 10. For example the disturbance is a degree of getting wet or a change of permittivity of the seating portion 10 caused by a change of humidity around the seat 1.

Figure 6:
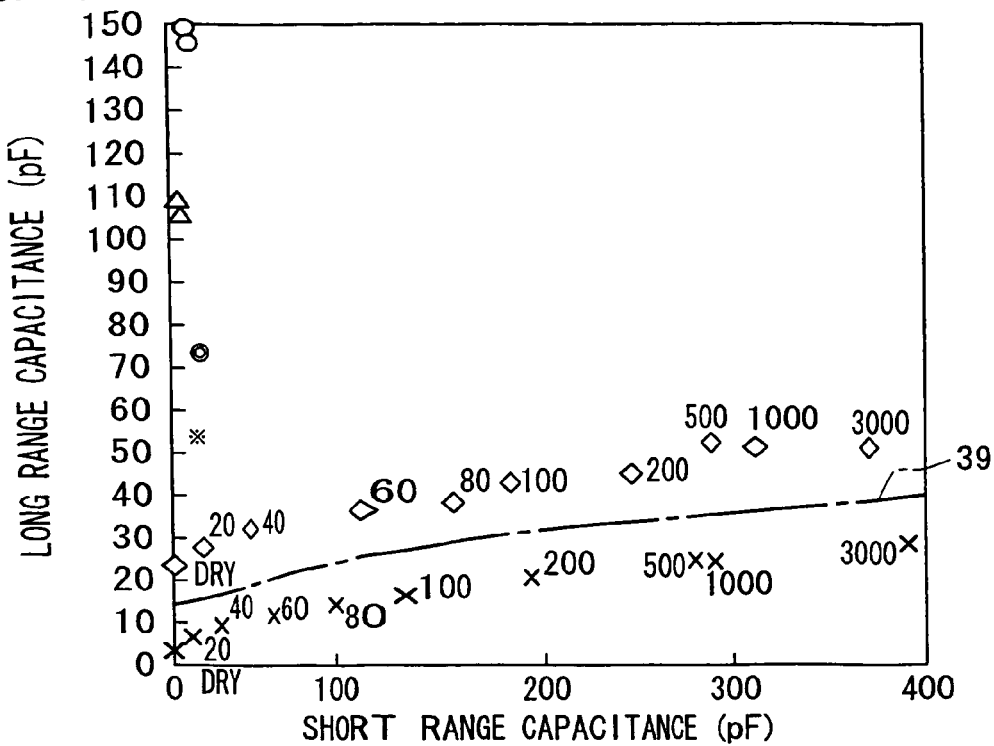
FIG. 6 is a graph showing the detected long range capacitance and the detected short range capacitance.

As shown in FIG. 6, examples of the long range capacitance and the short range capacitance are measured in several situations. In the situations, measurements are made for a male of a large size (specifically a size corresponding to 95 percentiles of the males in the US), a female of a small size (specifically a size corresponding to 5 percentiles of the females in the US), and a one year old child.

The double circle ⊚ in FIG. 6 shows a pair of a long range capacitance and a short range capacitance measured in a situation where the male of the large size sits on the seat 1 in a normal manner. The asterisk ✲ in FIG. 6 shows a pair of a long range capacitance and a short range capacitance measured in a situation where the female of the small size sits on the seat 1 in a normal manner.

Each of the single circles ○ in FIG. 6 shows a pair of a long range capacitance and a short range capacitance measured in a situation where the male of the large size touches the body while sitting on the seat 1. Each of the triangles Δ in FIG. 6 shows a pair of a long range capacitance and a short range capacitance measured in a situation where the female of the small size touches the body while sitting on the seat 1. In the situations shown by the single circles ○ and the triangles Δ, the body of the male or the female functions as the ground by being connected with the grounded body.

Each of the crosses × in FIG. 6 shows a pair of a long range capacitance and a short range capacitance measured in a situation where the one year old child is seated in a child restraint system fixed to the seat 1. Each of the rhomboids ◊ in FIG. 6 shows a pair of a long range capacitance and a short range capacitance measured in a situation where the female of the small size sits on the seat 1 while wearing a thick cloth (e.g., a ski cloth or a denim) with a thickness of about 6 mm.

A numeral at the vicinity of each of the rhomboids ◊ and the crosses × shows an amount (in milliliter) of water evenly sprayed on the entire seat 1 in the situation corresponding to the rhomboid ◊ or the cross ×. Words "DRY" at the vicinities of a rhomboid ◊ and a cross × show that water is not sprayed on the seat 1 in the situations corresponding to the rhomboid ◊ and the cross ×.

In the situations where no water is sprayed, the measured short range capacitances are zero or close to zero, and the measured long range capacities increase as the size of a seated body becomes larger.

In addition, in every part of the entire range of the short range capacitance in FIG. 6, a difference is clear between the long range capacitance for the women with the thick cloth and the long range capacitance for the one year old child. It is therefore possible to distinguish, by using a threshold line 39 in the FIG. 6, the situations where the woman with the thick cloth is sitting from the situations where the small child is seated on the child restraint system.

It is also shown in FIG. 6 that the short range capacitance and the long range capacitance become larger as the amount of the sprayed water (i.e. a degree of getting wet, humidity around the seat 1) increases. More specifically, in each of two groups of situations respectively for the woman in thick cloth and the one year old child in the child restraint system, a ratio of increase of the long range capacitance to increase of the short range capacitance is large in the case that the short range capacitance is smaller than 150 pF and is small in the case that the short range capacitance is larger than 150 pF (that is, the seat 1 is sufficiently wet). The ratios are almost the same for the two groups ◊ and × of the situations. This implies that the short range capacitance and the long range capacitance have a relation almost independent of a size of a person on the seat 1.

Figure 7:
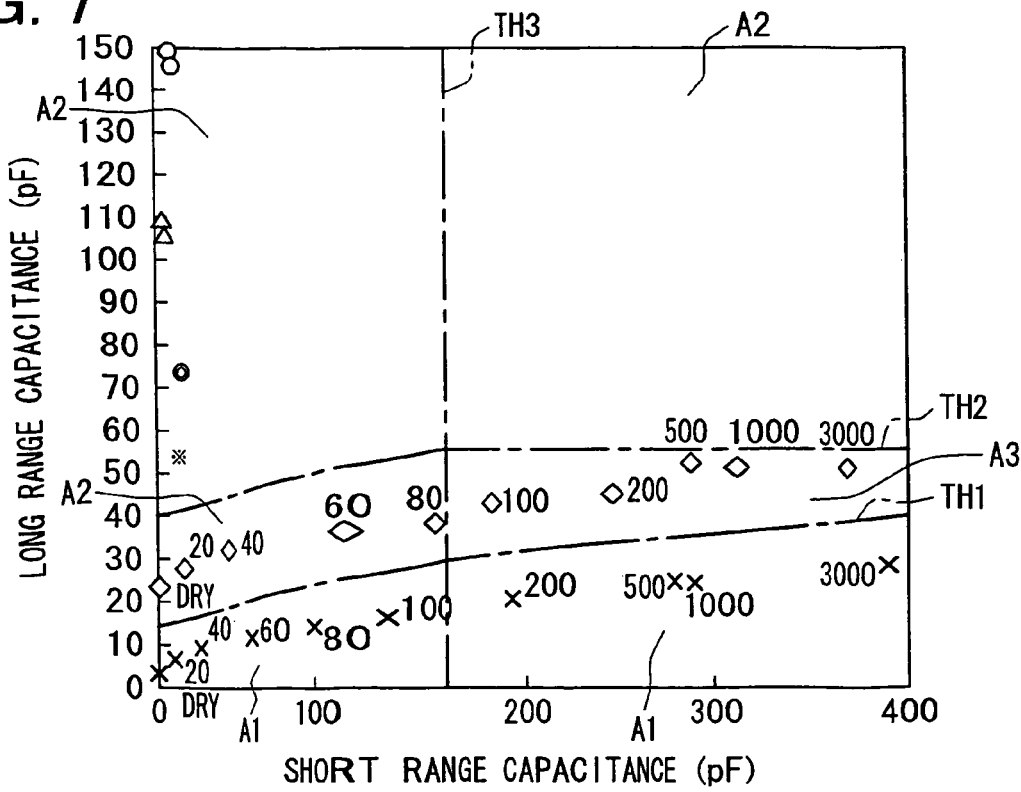
FIG. 7 is a graph showing ranges of the long range capacitance and the short range capacitance for the passenger detection system.

Based on the above characteristics, the control unit 50 uses the first threshold line TH1, the second threshold line TH2 and the third threshold line TH3 shown in FIG. 7 so as to detect a person on the seat 1. The third threshold line TH3 is a vertical line in which the short range capacitance is constantly 150 pF.

The first threshold line TH1 has, in a region where the short range capacitance is smaller than the third threshold line TH3 (i.e. 150 pF), a generally straight line with the first slope. The first threshold line TH1 also has, in a region where the short range capacitance is larger than the third threshold line TH3 (i.e. 150 pF), another generally straight line with the second slope which has a slope angle smaller than that of the first slope.

The second threshold line TH2 is a line shifted from the first threshold line TH1 in the upper direction by about 25 pF in the long range capacitance. The second threshold line TH2 is determined so that they have the long range capacitances, that are larger than a long range capacitance measured when the seat is sufficiently wet (i.e. humid), for the one year old child. The second threshold line TH2 is also determined based on the fact that the measured long range capacitance hardly increases while the measured short range capacitance increases in the case that the seat is sufficiently wet.

The entire area in the graph in FIG. 7 is divided by the threshold lines into three areas A1, A2 and A3. The first area A1 is the area below the first threshold line TH1. The control unit 50 determines that an infant child is sitting on a child restraint system on the seat 1, when the measured pair of the long range capacitance and the short range capacitance is in the first area A1.

The second area A2 includes the area above the second threshold line TH2. The second area A2 further includes an area between the threshold lines TH1 and TH2 in which the short range capacitance is smaller than that of the third threshold line TH3. The control unit 50 determines that a grown person is on the seat 1, when the measured pair of the long range capacitance and the short range capacitance is in the second area A2.

The third area A3 is an area between the threshold lines TH1 and TH2 in which the short range capacitance is larger than that of the third threshold line TH3. The control unit 50 determines that it is not possible to determine whether a passenger is on the seat 1 or not, when the measured pair of the long range capacitance and the short range capacitance is in the third area A3.

Figure 8:
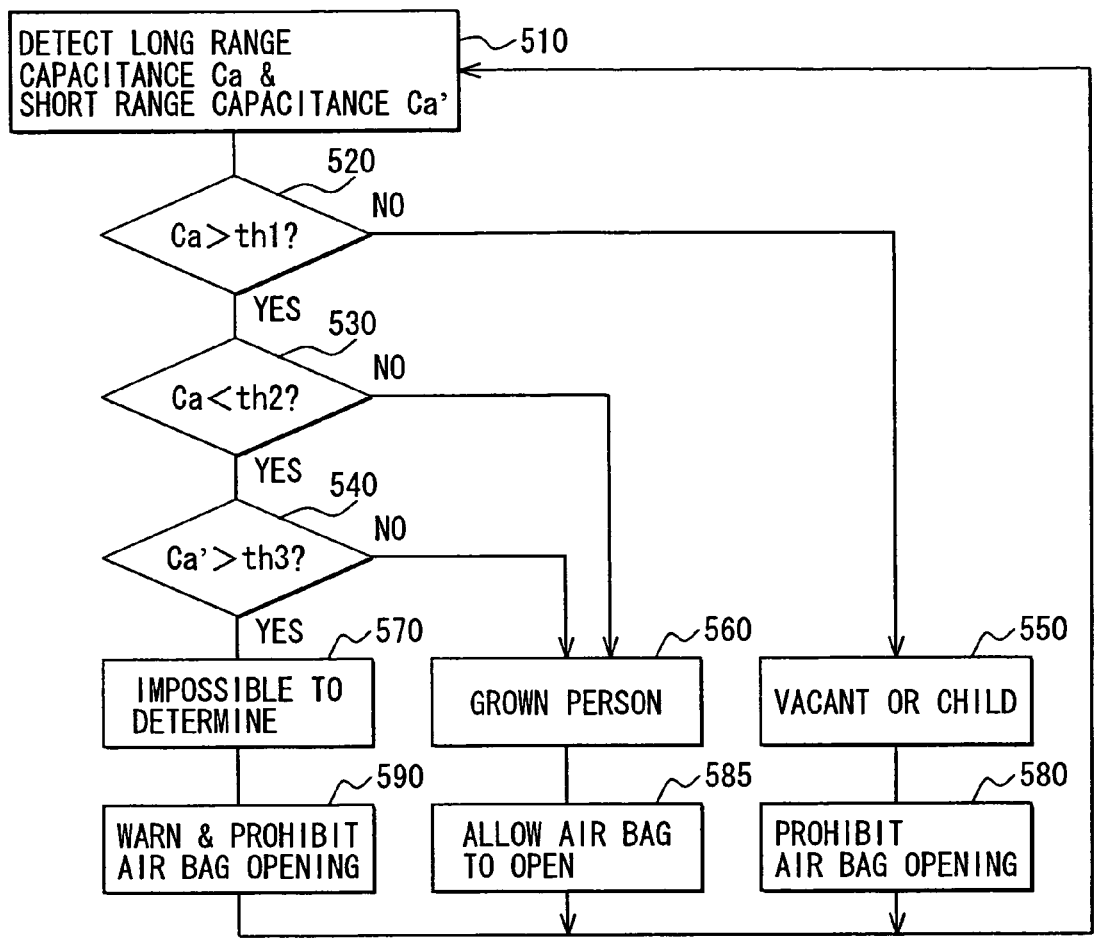
FIG. 8 is a flowchart showing an operation of the passenger detection system.

Hereafter, a process for detection of a passenger on the seat 1 will be described with reference to FIG. 8.

First, the control unit 50 measures at step 510 a short range capacitance Ca and a long range capacitance Ca in the way described above. The control unit 50 then specifies, as a first threshold value th1, a long range capacitance at a position on the first threshold line TH1 corresponding to a measured short range capacitance Ca'. The control unit 50 then compares at step 520 the specified first threshold value th1 with the measured long range capacitance Ca. When the long range capacitance Ca is smaller than the first threshold value th1, the control unit 50 determines at step 550 that a child restraint system is on the seat 1 or the seat 1 is vacant.

When the long range capacitance Ca is larger than the first threshold value th1, the control unit 50 then specifies, as a second threshold value th2, a long range capacitance Ca at a position on the second threshold line TH2 corresponding to the measured short range capacitance Ca'. The control unit 50 then compares at step 530 the specified second threshold value th2 with the measured long range capacitance Ca. When the long range capacitance Ca is larger than the second threshold value th2, the control unit 50 determines at step 560 that a grown person is sitting on the seat 1.

When the long range capacitance Ca is smaller than the second threshold value th2, the control unit 50 then specifies a third threshold value th3 to be the short range capacitance of the third threshold line TH3. The control unit 50 then compares at step 540 the specified third threshold value th3 with the measured short range capacitance Ca'. When the measured short range capacitance Ca' is smaller than the third threshold value th3, the control unit 50 determines at step 560 that a grown person is sitting on the seat 1. When the measured short range capacitance Ca' is larger than the third threshold value th3, the control unit 50 determines at step 570 that it is impossible to determine whether a person is on the seat 1 or not. The operation is based on the fact that an accuracy of the measurement of the long range capacitance and the short range capacitance decreases when the seat is excessively wet.

The passenger detection system of the embodiment is capable of outputting the result of detection of the passenger on the seat 1 to a controlling device for a passenger protection device such as an air bag. By outputting the result, it is possible to operate the passenger protection device for individual passengers. More specifically, when a passenger on a seat in the vehicle is not a grown person, the passenger detection system may prohibit at step 580 an air bag for the seat from expanding in a car crash.

When the passenger detection system determines that it is impossible to determine whether a person is on the seat or not, the passenger detection system may accordingly warn at step 590 the passenger in the vehicle and may prohibit the air bag for the seat from expanding in a car crash. In this case, the passenger detection system may require a passenger in the vehicle an instruction as to whether or not to inflate the air bag when the vehicle collides an object.

Thus, the passenger detection system can inflate at step 585 the air bag only when a passenger on the seat is a grown person who is likely to be protected by the air bag. In addition, the passenger detection system can protect a child who is not protected by the air bag, by prohibiting the air bag from expanding when the child is on the seat.

The passenger detection system of the present invention thus detects a passenger on the seat by means of the measurements of the long distance capacitance sensor and the short distance capacitance sensor. More specifically, the passenger detection system detects based on the measured short range capacitance a condition (such as humidity or a degree of getting wet) of the seat 1, and detects the passenger based on the detected condition and the measured long range capacitance. The passenger detection system thereby detects absence/presence of a passenger on the seat 1 and a physical size of the passenger.

The detection of the passenger on the seat 1 is made by specifying based on the measured short range capacitance a threshold value and subsequently by comparing the threshold value with the measured long range capacitance. By using the threshold value for the long range capacitance determined based on the short range capacitance, the detection of the passenger can be made even without correction of the measured long range capacitance. In this case, processing of measured data becomes simple and therefore it is easy to detect the passenger on the seat 1.

In addition, multiple electrodes 22 and 25 are incorporated to the seating portion 10 and are commonly used for detecting both the long range capacitance and the short range capacitance. Therefore, the number of units necessary for manufacturing the long range capacitance sensor and the short range capacitance sensor is reduced.

In addition, the short range capacitance between the electrodes 22 and 25 is measured while one of the electrodes 22 and 25 having a larger surface area has the same electric potential with the body.

The state of the seat 1 changes not only when the seat 1 gets wet but also when the temperature of the seat 1 changes. The passenger detection system of the present invention can detect the state of the seat 1 by means of the short range capacitance detector and can thereby detect with a high accuracy a passenger on the seat 1.

OTHER EMBODIMENTS

The present invention should not be limited to the embodiment discussed above and shown in the figures, but may be implemented in various ways without departing from the spirit of the invention.

Figure 9:
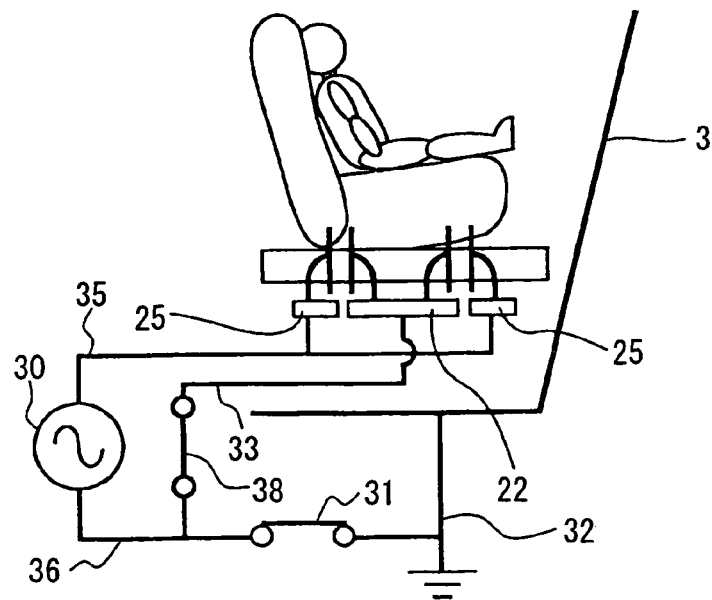
FIG. 9 is a schematic view showing another method in which the passenger detection system detects the short range capacitance.

For example, the short range capacitance can be measured in a way shown in FIG. 9 where the first electrode portion 22, which has a surface area larger than that of the second electrode portion 25, is connected with the ground through the lines 33, a switch 38 and the switch 31. In FIG. 9, the second electrode portion 25 is given a high electric potential by the voltage source 30 through the line 35.

In the above embodiment, the backrest portion of the seat serves as an example of the body of the vehicle. However, the backrest portion may be replaced with any other portion of the vehicle body (e.g., a chassis of the vehicle) which has the same electric potential with a negative pole of the battery of the vehicle.

Such changes and modifications are to be understood as being within the scope of the present invention as defined by the appended claims.

What is claimed is:

1. A passenger detection system for a person on a seat of a vehicle, comprising:
  a first capacitance sensor for measuring a first capacitance between a seating portion of the seat and a body of the vehicle;
  a second capacitance sensor different than the first capacitance sensor for measuring a second capacitance within the seating portion of the seat; and
  a detection unit which detects a passenger on the seat based on the measured first capacitance and the measured second capacitance; wherein
  the detection unit detects the passenger on the seat base on a comparison between the measured first capacitance and a variable first threshold value, the variable first threshold value being continuously determined by a comparison between the measured first capacitance and the measured second capacitance.

2. The passenger detection system according to claim 1, wherein:
the first and second capacitance sensors are constructed with a plurality of electrodes located in the seat, the electrodes having the same electric potential and being electrically separated from the body;
the first capacitance sensor measures as the first capacitance a capacitance between the body and the electrodes; and
the second capacitance sensor measures as the second capacitance a capacitance between the electrodes.

3. The passenger detection system according to claim 1, wherein:
the first and second capacitance sensors are constructed with a first electrode and a second electrode having different surface areas;
the second capacitance sensor measures as the second capacitance a capacitance between the first and second electrodes; and
the first electrode has a surface area larger than the second electrode.

4. The passenger detection system according to claim 3, wherein one of the first and second electrodes has the same electric potential with the body.

5. The passenger detection system according to claim 1, wherein:
when the first capacitance is smaller than the variable first threshold value which is changed in accordance with the second capacitance, the detection unit detects that the passenger is a child or no passenger is on the seat; and
when the first capacitance is larger than a variable second threshold value which is continuously changed in accordance with the second capacitance and is larger than the variable first threshold, the detection unit detects that the passenger is a grown person.

6. The passenger detection system according to claim 5, wherein:
in a case where the first capacitance is between the variable first threshold value and the variable second threshold value, the detection unit detects that the passenger is a grown person when the second capacitance is smaller than a third threshold value.

7. The passenger detection system according to claim 1, wherein the detection unit detects the passenger on the seat based on a predetermined relationship between the measured first capacitance and the measured second capacitance.

8. The passenger detection system according to claim 1, wherein the detection unit detects the passenger on the seat based on a comparison between the measured first capacitance and a variable second threshoid value different than the variable first threshold value, the variable second threshold value being continuously determined by a comparison between the measured first capacitance and the measured second capacitance.

9. The passenger detection system according to claim 8, wherein the detection unit detects the passenger on the seat based on a comparison between the measured second capacitance and a third threshold value, the third threshold value being a specified value.

10. A passenger detection system for a person on a seat of a vehicle, comprising:
a first capacitance sensor having electrodes spaced a first distance for measuring a first capacitance between a seating portion of the seat and a body of the vehicle;
a second capacitance sensor having electrodes spaced a second distance less than the first distance for measuring a second capacitance within the seating portion of the seat; and
a detection unit which detects a passenger on the seat based on the measured first capacitance and the measured second capacitance; wherein
the detection unit detects the passenger on the seat base on a comparison between the measured first capacitance and a variable first threshold value, the variable first threshold value being continuously determined by a comparison between the measured first capacitance and the measured second capacitance.

11. The passenger detection system according to claim 10, wherein:
the first and second capacitance sensors are constructed with a plurality of electrodes located in the seat, the electrodes having the same electric potential and being electrically separated from the body;
the first capacitance sensor measures as the first capacitance a capacitance between the body and the electrodes; and
the second capacitance sensor measures as the second capacitance a capacitance between the electrodes.

12. The passenger detection system according to claim 10, wherein:
the first and second capacitance sensors are constructed with a first electrode and a second electrode having different surface areas;
the second capacitance sensor measures as the second capacitance a capacitance between the first and second electrodes; and
the first electrode has a surface area larger than the second electrode.

13. The passenger detection system according to claim 12, wherein one of the first and second electrodes has the same electric potential with the body.

14. The passenger detection system according to claim 10, wherein the detection unit detects the passenger on the seat based on a comparison between the measured first capacitance and a variable second threshold value different than the variable first threshold value, the variable second threshold value being determined by a comparison between the measured first capacitance and the measured second capacitance.

15. The passenger detection system according to claim 14, wherein the detection unit detects the passenger on the seat based on a comparison between the measured second capacitance and a third threshold value, the third threshold value being a specified value.

16. A passenger detection system for a person on a seat of a vehicle, comprising:
a first capacitance sensor for measuring a first capacitance between a seating portion of the seat and a backrest portion of the seat of the vehicle;
a second capacitance sensor for measuring a second capacitance within the seating portion of the seat; and
a detection unit which detects a passenger on the seat based on the measured first capacitance and the measured second capacitance; wherein
the detection unit detects the passenger on the seat base on a comparison between the measured first capacitance and a variable first threshold value, the variable first threshold value being continuously determined by a comparison between the measured first capacitance and the measured second capacitance.

17. The passenger detection system according to claim 16, wherein:

the first and second capacitance sensors are constructed with a plurality of electrodes located in the seat, the electrodes having the same electric potential and being electrically separated from the body;

the first capacitance sensor measures as the first capacitance a capacitance between the body and the electrodes; and the second capacitance sensor measures as the second capacitance a capacitance between the electrodes.

18. The passenger detection system according to claim 16, wherein:

the first and second capacitance sensors are constructed with a first electrode and a second electrode having different surface areas;

the second capacitance sensor measures as the second capacitance a capacitance between the first and second electrodes; and the first electrode has a surface area larger than the second electrode.

19. The passenger detection system according to claim 18, wherein one of the first and second electrodes has the same electric potential with the body.

20. The passenger detection system according to claim 16, wherein the detection unit detects the passenger on the seat based on a comparison between the measured first capacitance and a variable second threshold value different than the variable first threshold value, the second threshold value being continuously determined by a comparison between the measured first capacitance and the measured second capacitance.

21. The passenger detection system according to claim 20, wherein the detection unit detects the passenger on the seat based on a comparison between the measured second capacitance and a third threshold value, the third threshold value being a specified value.

* * * * *